United States Patent
Snider et al.

(10) Patent No.: US 11,215,074 B2
(45) Date of Patent: Jan. 4, 2022

(54) OXIDATION ACTIVATED COOLING FLOW

(71) Applicant: General Electric Company, Schenectady, NY (US)

(72) Inventors: Zachary John Snider, Simpsonville, SC (US); Matthew Troy Hafner, Honea Path, SC (US); Lyndsay Marie Kibler, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 275 days.

(21) Appl. No.: 16/504,865

(22) Filed: Jul. 8, 2019

(65) Prior Publication Data
US 2021/0010423 A1  Jan. 14, 2021

(51) Int. Cl.
| | | |
|---|---|---|
| *F01D 25/12* | (2006.01) | |
| *F01D 25/14* | (2006.01) | |
| *F01D 21/14* | (2006.01) | |
| *B33Y 80/00* | (2015.01) | |

(52) U.S. Cl.
CPC .............. *F01D 25/12* (2013.01); *F01D 21/14* (2013.01); *F01D 25/14* (2013.01); *B33Y 80/00* (2014.12); *F05D 2240/11* (2013.01); *F05D 2260/201* (2013.01); *F05D 2260/95* (2013.01); *F05D 2270/112* (2013.01); *F05D 2270/301* (2013.01)

(58) Field of Classification Search
CPC .......... F01D 25/12; F01D 25/14; F01D 21/14; F05D 2260/95; F05D 2240/11
See application file for complete search history.

(56) References Cited

U.S. PATENT DOCUMENTS

| | | | | |
|---|---|---|---|---|
| 4,329,114 | A | * | 5/1982 | Johnston ................. F01D 11/24 415/116 |
| 5,022,817 | A | | 6/1991 | O'Halloran |
| 5,358,374 | A | | 10/1994 | Correia et al. |
| 10,480,342 | B2 | * | 11/2019 | Varney ..................... F01D 11/24 |

(Continued)

FOREIGN PATENT DOCUMENTS

| | | | | |
|---|---|---|---|---|
| EP | 1696102 A1 | * | 8/2006 | ............ F01D 21/12 |
| FR | 3095231 A1 | * | 10/2020 | ............ F01D 5/082 |

(Continued)

OTHER PUBLICATIONS

International Search Report and Written Opinion for corresponding application PCT/US2020/040050 dated Oct. 2, 2020; p. 12.

*Primary Examiner* — Topaz L. Elliot
(74) *Attorney, Agent, or Firm* — James Pemrick; Hoffman Warnick LLC

(57) ABSTRACT

A flow regulating system for increasing a flow of cooling fluid supplied to a cooling system of a component of a gas turbine system is provided. The flow regulating system includes: a pneumatic circuit embedded within a section of the component, the pneumatic circuit including a set of interconnected pneumatic passages; and a pressure-actuated switch fluidly coupled to the pneumatic circuit. The pressure-actuated switch is activated in response to a formation of a breach in the section of the component and an exposure of at least one of the pneumatic passages of the pneumatic circuit embedded in the section of the component. The activation of the pressure-actuated switch increases the flow of cooling fluid supplied to the cooling system of the component.

17 Claims, 9 Drawing Sheets

(56) References Cited

U.S. PATENT DOCUMENTS

| | | | |
|---|---|---|---|
| 2006/0263216 A1* | 11/2006 | Brummel | F01D 21/12 |
| | | | 416/61 |
| 2009/0196737 A1 | 8/2009 | Mitchell | |
| 2010/0303616 A1 | 12/2010 | Chir et al. | |
| 2011/0088405 A1 | 4/2011 | Turco | |
| 2014/0166255 A1* | 6/2014 | Bogue | F01D 5/284 |
| | | | 165/168 |
| 2015/0198062 A1* | 7/2015 | Morgan | F01D 5/186 |
| | | | 415/1 |
| 2016/0003052 A1* | 1/2016 | Shi | C23C 30/00 |
| | | | 416/231 R |
| 2016/0341125 A1* | 11/2016 | Kraft | F01D 9/065 |
| 2017/0175572 A1 | 6/2017 | Vetters | |
| 2017/0204736 A1* | 7/2017 | Varney | F01D 11/24 |
| 2018/0045057 A1* | 2/2018 | Tallman | F02C 7/12 |
| 2018/0156039 A1* | 6/2018 | Tallman | F01D 5/186 |
| 2019/0210132 A1* | 7/2019 | Dyson | B23H 9/10 |
| 2020/0240273 A1* | 7/2020 | Tallman | F01D 25/12 |
| 2020/0308977 A1* | 10/2020 | Ekra Devalere | F02C 6/08 |
| 2021/0017864 A1* | 1/2021 | Honkomp | F01D 5/188 |
| 2021/0017907 A1* | 1/2021 | Groves, II | F01D 5/186 |
| 2021/0123348 A1* | 4/2021 | Hafner | F01D 5/187 |

FOREIGN PATENT DOCUMENTS

| | | | | |
|---|---|---|---|---|
| GB | 2054741 A | | 2/1981 | |
| GB | 2246836 A | * | 2/1992 | F01D 5/081 |

* cited by examiner

OXIDATION ACTIVATED COOLING FLOW

BACKGROUND

The disclosure relates generally to gas turbine systems, and more particularly, to the provision of a supplemental flow of cooling fluid to a component of a gas turbine system undergoing oxidation.

Gas turbine systems are one example of turbomachines widely utilized in fields such as power generation. A conventional gas turbine system generally includes a compressor section, a combustor section, and a turbine section. During operation of a gas turbine system, various components in the system, such as turbine blades, nozzle airfoils, and shroud segments are subjected to high temperature gas flows, which can cause the components to fail. Since higher temperature flows generally result in increased performance, efficiency, and power output of a gas turbine system, it is advantageous to cool the components that are subjected to high temperature gas flows to allow the gas turbine system to operate at increased temperatures and to extend the lifetime of the components of a gas turbine system.

Cooling (e.g., convection cooling, impingement cooling, etc.) is often provided by directing a flow of a cooling fluid through internal passages formed in the components of the gas turbine system. In many cases, the cooling fluid is provided by bleeding off a portion of the air discharged by the compressor section of the gas turbine system.

A thermal barrier coating (TBC) is often applied to the components of a gas turbine system to provide a protective heat shield, prevent damage due to high temperatures, and extend component life by reducing oxidation and thermal fatigue. Spallation of the TBC is a common issue in gas turbine systems. When the TBC spalls, portions of the TBC may crack and break off of a component, exposing underlying surfaces to high temperatures and damage (e.g., due to oxidation).

SUMMARY

A first embodiment is directed to a flow regulating system for increasing a flow of cooling fluid supplied to a cooling system of a component of a gas turbine system, including: a pneumatic circuit embedded within a section of the component, the pneumatic circuit including a set of interconnected pneumatic passages; and a pressure-actuated switch fluidly coupled to the pneumatic circuit, wherein the pressure-actuated switch is activated in response to a formation of a breach in the section of the component and an exposure of at least one of the pneumatic passages of the pneumatic circuit embedded in the section of the component; wherein the activation of the pressure-actuated switch increases the flow of cooling fluid supplied to the cooling system of the component.

Another embodiment provides a method for controlling oxidation in a vicinity of a breach in a component of a gas turbine system, the method including: monitoring a pressure in a pneumatic circuit embedded within a section of the component, the pneumatic circuit including a set of interconnected pneumatic passages; and, in response to a reduction in the pressure within the pneumatic circuit, providing a supplemental flow of cooling fluid or an increased flow of cooling fluid to a cooling system of the component, the supplemental flow of cooling fluid or the increased flow of cooling fluid impeding or arresting oxidation in the vicinity of the breach in the component.

A further embodiment is directed to a system, including: a turbine shroud; a cooling system for cooling the turbine shroud; and a flow regulating system for increasing a flow of cooling fluid supplied to the cooling system of the turbine shroud, the flow regulating system including: a pneumatic circuit embedded within a section of the turbine shroud, the pneumatic circuit including a set of interconnected pneumatic passages; and a pressure-actuated switch fluidly coupled to the pneumatic circuit, wherein the pressure-actuated switch is activated in response to a formation of a breach in the section of the turbine shroud and an exposure of at least one of the pneumatic passages of the pneumatic circuit embedded in the section of the turbine shroud; wherein the activation of the pressure-actuated switch increases the flow of cooling fluid supplied to the cooling system of the turbine shroud.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

Figure 1:
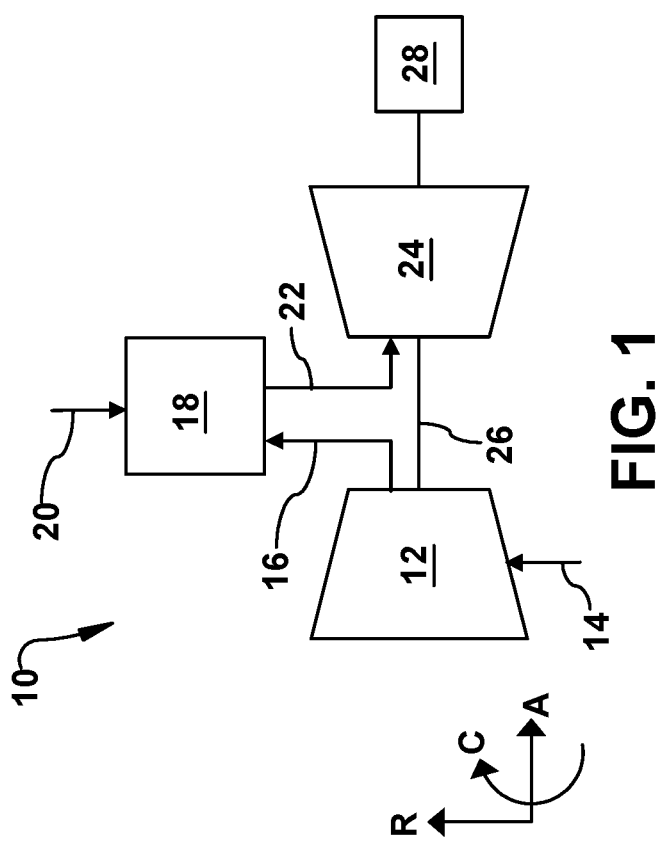
FIG. 1 depicts a schematic diagram of a gas turbine system according to embodiments.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As an initial matter, in order to clearly describe the current disclosure, it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively. It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the gas turbine system (in particular, the rotor section). As further used herein, the terms "radial" and/or "radially" refer to the relative position/direction of objects along a direction "R" (see, FIG. 1), which is substantially perpendicular with axis A and intersects axis A at only one location. Finally, the term "circumferential" refers to movement or position around axis A (e.g., direction "C").

In various embodiments, components described as being "fluidly coupled" to or "in fluid communication" with one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

FIG. 1 depicts a schematic diagram of a gas turbine system 10 according to various embodiments. As shown, the gas turbine system 10 includes a compressor section 12 for compressing an incoming flow of air 14 and for delivering a flow of compressed air 16 to a combustor section 18. The combustor section 18 mixes the flow of compressed air 16 with a pressurized supply of fuel 20 and ignites the mixture to create a flow of combustion gases 22. Although only a single combustor section 18 is shown, the gas turbine system 10 may include any number of combustor sections 18. The flow of combustion gases 22 is in turn delivered to a turbine section 24. The flow of combustion gases 22 drives the turbine section 24 to produce mechanical work. The mechanical work produced in the turbine section 24 may drive the compressor section 12 via a shaft 26 and may be used to drive an external load 28, such as an electrical generator and/or the like.

Figure 2:
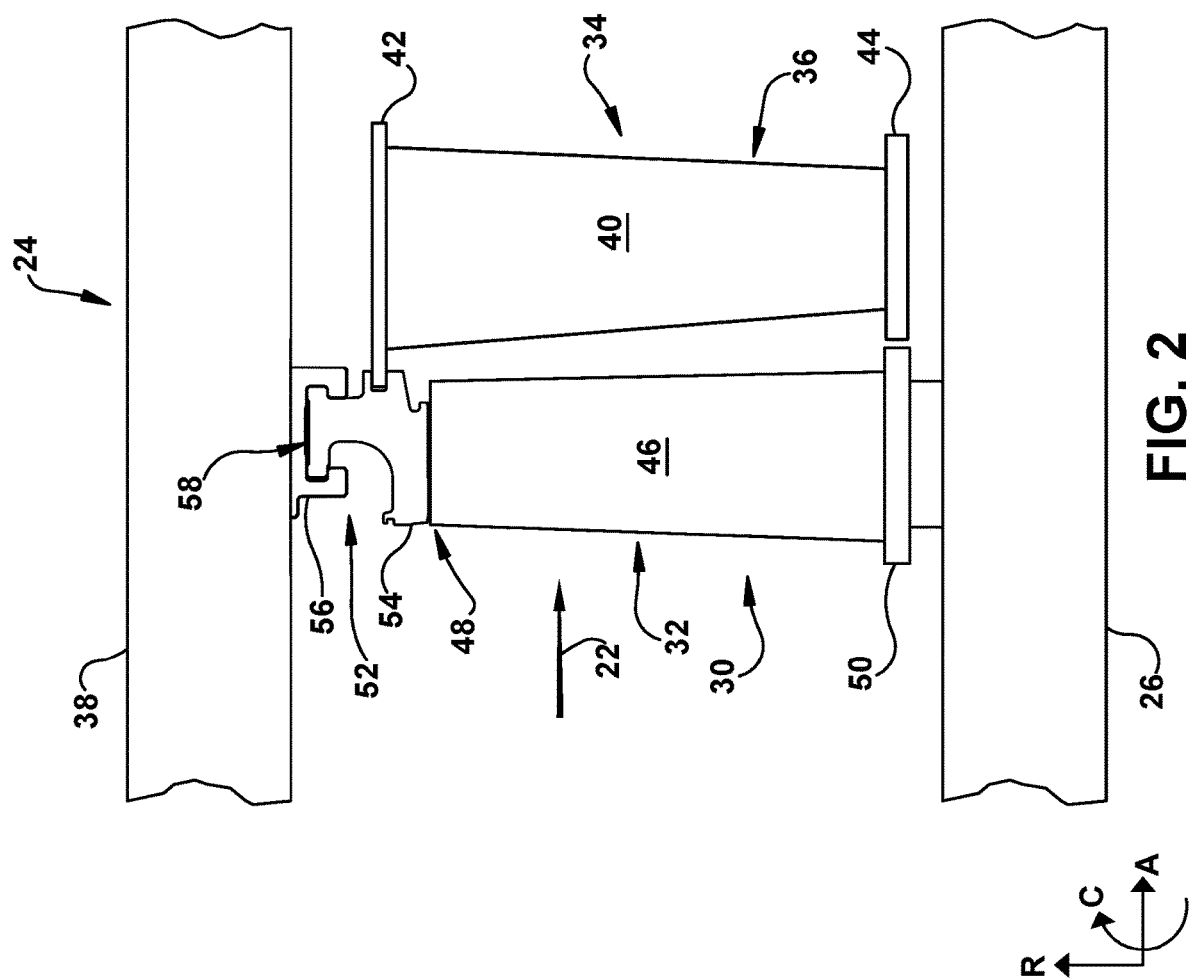
FIG. 2 depicts a side view of a portion of a turbine section of a gas turbine system according to embodiments.

FIG. 2 depicts a side view of a portion of a turbine section 24 of a gas turbine system, including at least one stage 30 of turbine blades 32 (one shown) and at least one stage 34 of nozzles 36 (one shown) positioned within a casing 38 of the turbine section 24 ("turbine casing 38"). Each stage 30 of turbine blades 32 includes a plurality of turbine blades 32 that are coupled to and positioned circumferentially about the rotor 26, and which are driven by the combustion gases 22. Each stage 34 of nozzles 36 includes a plurality of nozzles 36 that are coupled to and positioned circumferentially about the turbine casing 38 of the turbine section 24.

In the embodiment shown in FIG. 2, each nozzle 36 includes an airfoil 40 positioned between an outer platform 42 and an inner platform 44. Similar to the nozzles 36, each turbine blade 32 of the turbine section 24 includes an airfoil 46 extending radially from the rotor 26. Each airfoil 46 includes a tip portion 48 and a platform 50 positioned opposite the tip portion 48.

The turbine blades 32 and the nozzles 36 may be positioned axially adjacent to one another within the turbine casing 38. In FIG. 2, for example, the nozzles 36 are shown positioned axially adjacent and downstream of the turbine blades 32. The turbine section 24 may include a plurality of stages 30 of turbine blades 32 and a plurality of stages 34 of nozzles 36, positioned axially throughout the turbine casing 38.

The turbine section 24 of the gas turbine system 10 may include a plurality of stages 52 of shrouds 54 (one stage shown in FIG. 2) positioned axially throughout the turbine casing 38. In FIG. 2, for example, the stage 52 of shrouds 54 is shown positioned radially adjacent to and substantially surrounding or encircling the stage 30 of turbine blades 32. The stage 52 of shrouds 54 may also be positioned axially adjacent and/or upstream of the stage 34 of nozzles 36. Further, the stage 52 of shrouds 54 may be positioned between two adjacent stages 34 of nozzles 36 located on opposing sides of a stage 30 of turbine blades 32. The stage 52 of shrouds 54 may be coupled about the turbine casing 38 using a set of extensions 56, each including an opening 58 configured to receive a corresponding section of a shroud 54.

Figure 3:
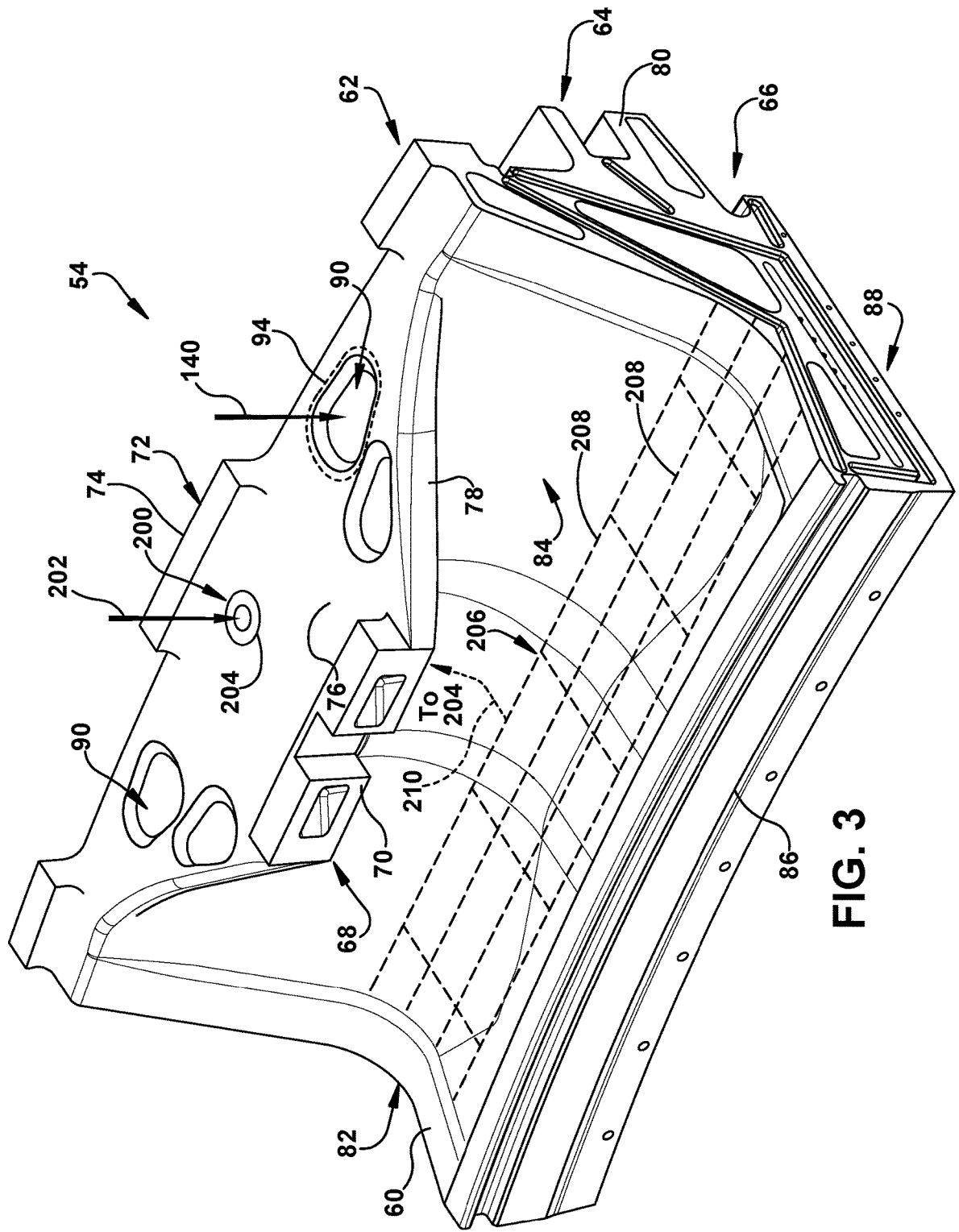
FIG. 3 depicts an isometric view of a turbine shroud according to embodiments.
Figure 4:
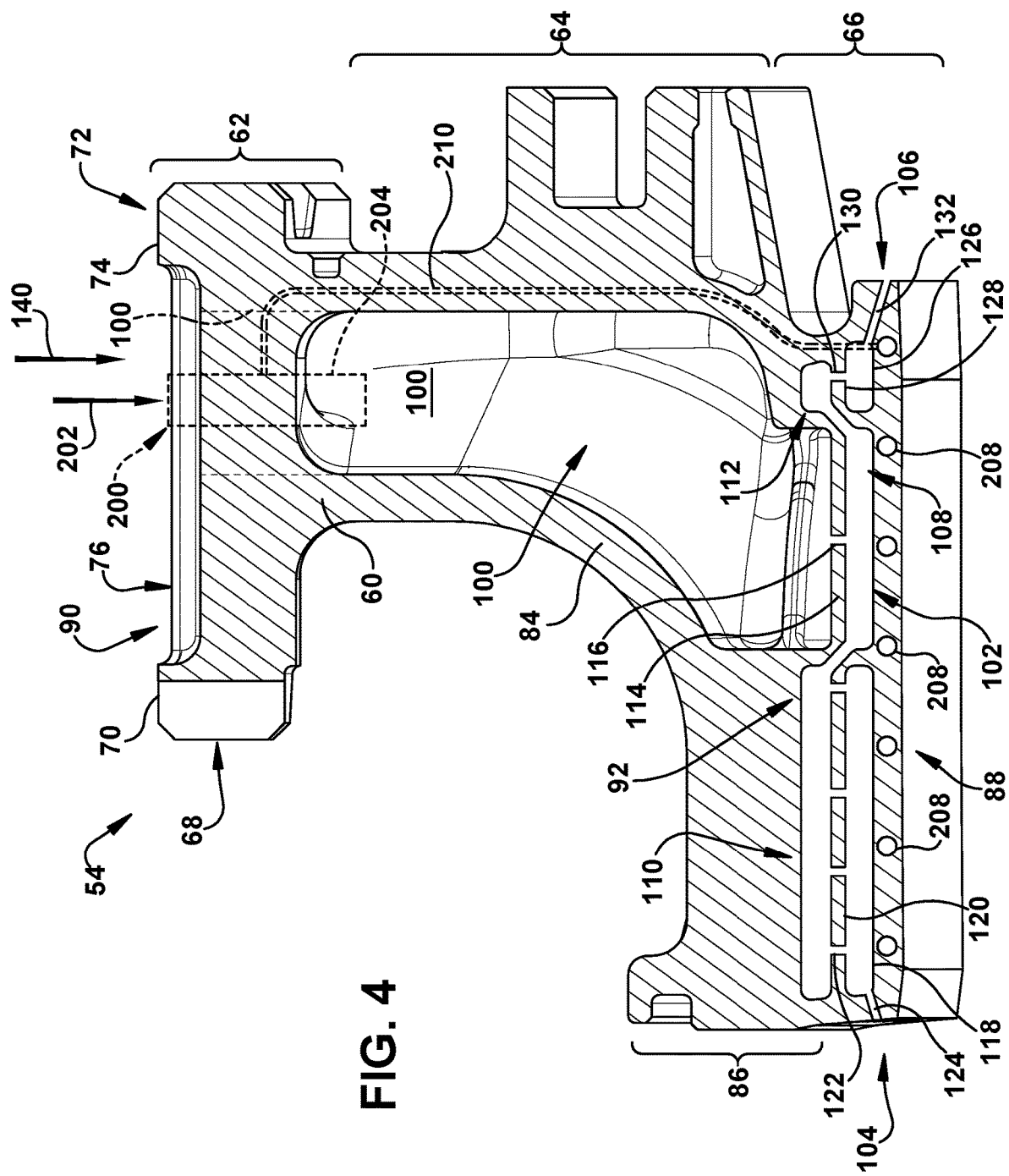
FIG. 4 is a cross-sectional view of the turbine shroud of FIG. 3 according to embodiments.

An isometric view of a turbine shroud 54 is depicted in FIG. 3 and a cross-sectional view of the turbine shroud 54 is depicted in FIG. 4. As shown, the turbine shroud 54 includes a body 60. The body 60 of the turbine shroud 54, and various other components and/or features of the turbine shroud 54, may be formed using any suitable technique, including an additive manufacturing process. For example, the turbine shroud 54 including body 60 may be formed by direct metal laser melting (DMLM) (also referred to as selective laser melting (SLM)), direct metal laser sintering (DMLS), electronic beam melting (EBM), stereolithography (SLA), binder jetting, or any other suitable additive manufacturing process.

The body 60 of the turbine shroud 54 includes a support portion 62, an intermediate portion 64, and a seal portion 66. The support portion 62 is coupled directly to and/or aids in the coupling of the turbine shroud 54 to the turbine casing 38 and/or extension 56 (see, FIG. 2). The support portion 62 includes a forward end 68 including at least one forward hook 70, an aft end 72 including at least one aft hook 74, a first surface 76, and a second surface 78. The intermediate portion 64 includes various features of the body 60 between opposing slash faces 80, 82 of the body 60, including a non-linear segment 84 and a forward segment 86. The forward segment 86 may be used, for example, to form a seal within the turbine section 24, define a hot gas flow path of combustion gases 22 flowing through the turbine section 24, and/or secure nozzles 36 within the turbine casing 38. The seal portion 66 may at least partially define the flow path of combustion gases 22 flowing through turbine section 24. The seal portion 66 includes a hot gas path (HGP) surface 88 that may be positioned adjacent the hot gas flow path of combustion gases 22 within the turbine section 24.

The body 60 of the turbine shroud 54 further includes at least one inlet opening 90, formed in and/or through the first surface 76 of the support portion 62, between the forward end 68 and the aft end 72 of the body 60. The inlet opening 90 is in fluid communication with a cooling circuit 92 (FIG. 4) formed through and/or included within the support portion 62, intermediate portion 64, and seal portion 66 of the body 60.

The turbine shroud 54 may also include a set of metering plates 94 (shown in phantom in FIG. 3) coupled to the first surface 76 of the support portion 62 of the body 60. Each metering plate 94 (only one shown) may be affixed to the first surface 76, over and/or at least partially covering a respective inlet opening 90. The metering plate 94 allows a predetermined flow of cooling fluid to enter the cooling circuit 92 via the inlet opening 90.

Various plenum(s) and/or cooling passage(s) of the turbine shroud 54 are depicted in FIG. 4, which is a cross-sectional view of the turbine shroud 54 of FIG. 3. As shown, the turbine shroud 54 includes at least one plenum 100, which may be formed and/or extend through a portion of the body 60 of the turbine shroud 54. More specifically, the plenum 100 may extend (radially) through at least a portion of the support portion 62, intermediate portion 64, and the seal portion 66 of the body 60 of the turbine shroud 54. One or more portions of the plenum 100 formed within the intermediate portion 64 and the seal portion 66 of the body 60 may extend between and/or adjacent the opposing slash faces 80, 82. Although only a single plenum 100 is shown, it is understood that the turbine shroud 54 may include additional plenums.

The plenum 100 is fluidly coupled to and/or in direct fluid communication with the inlet opening(s) 90 formed in the support portion 62 of the body 60. As discussed herein, the plenum 100 is configured to receive a supply of cooling fluid 140 (e.g., compressor discharge air) via the inlet opening(s) 90, and may provide the cooling fluid 140 to distinct cooling passages formed in the turbine shroud 54 to cool the turbine shroud 54 during operation of the gas turbine system 10.

As shown in FIG. 4, the turbine shroud 54 includes a first cooling passage 102 formed, positioned, and/or extending within the body 60 of the turbine shroud 54 and in fluid communication with the plenum 100. More specifically, the first cooling passage 102 may be positioned within and/or extend through the seal portion 66 of the body 60 of the turbine shroud 54, between and/or adjacent a forward end 104 and an aft end 106 of the body 60. Additionally, the first cooling passage 102 may extend through the seal portion 66 of the body 60 between and/or adjacent the opposing slash faces 80, 82. The first cooling passage 102 may also be positioned within the seal portion 66 radially between the plenum 100 and the HGP surface 88 of the seal portion 66.

The first cooling passage 102 may include a plurality of distinct segments, sections, and/or parts. For example, the first cooling passage 102 is shown as including a central part 108 positioned and/or extending between a forward part 110, and an aft part 112. As shown in FIG. 4, the central part 108 of the first cooling passage 102 is centrally formed and/or positioned between the forward end 104 and the aft end 106 of the seal portion 66. The forward part 110 of the first cooling passage 102 is formed and/or positioned directly adjacent the forward end 104 of the seal portion 66, and axially adjacent and/or axially upstream of the central part 108. Similarly, the aft part 112 of the first cooling passage 102 is formed and/or positioned directly adjacent the aft end 106 of the seal portion 66, opposite the forward part 110. The central part 108 may be radially aligned with the axial portion of the HGP surface 88 of the seal portion 66 that requires the most cooling and/or demands the largest heat exchange within the turbine shroud 54 to improve the operational efficiency of the turbine section 24 and/or the operational life of the turbine shroud 54 within the turbine section 24.

The plenum 100 and the first cooling passage 102 are separated by a rib 114. The rib 114 may extend within the body 60 of the turbine shroud 54 between the opposing slash faces 80, 82. A plurality of impingement openings 116 are provided through the rib 114. The impingement openings 116 fluidly couple the plenum 100 and the central part 108 of the first cooling passage 102. During operation of the gas turbine system 10, cooling fluid 140 flows from the plenum 100 through the plurality of impingement openings 116 into the central portion 108 of the first cooling passage 102.

In addition to first cooling passage 102, the body 60 of the turbine shroud 54 includes a second cooling passage 118. As depicted in FIG. 4, the second cooling passage 118 extends within the body 60 of the turbine shroud 54 adjacent the forward end 104 of the seal portion 66, and may extend within the seal portion 66 between the opposing slash faces 80, 82. The second cooling passage 118 is positioned adjacent to and upstream of the central part 108 of the first cooling passage 102, and is positioned radially inward from the forward part 110 of the first cooling passage 102. Further, the second cooling passage 118 is formed or positioned between the forward part 110 of the first cooling passage 102 and the HGP surface 88 of the seal portion 66.

A rib 120 separates the second cooling the passage 118 from the forward part 110 of the first cooling passage 102. The rib 120 may extend within the body 60 of the turbine shroud 54 between the opposing slash faces 80, 82. The second cooling passage 118 is in direct fluid communication with the forward part 110 of the first cooling passage 102. A plurality of impingement openings 122, formed through the rib 120, fluidly couple the forward part 110 of the first cooling passage 102 and the second cooling passage 118. During operation of the gas turbine system 10 (see, FIG. 1), cooling fluid 140 flowing through the forward part 110 of the first cooling passage 102 passes or flows from the forward part 110 of the first cooling passage 102 through the impingement openings 122 to second cooling passage 118.

The body 60 of the turbine shroud 54 further includes a plurality of forward exhaust holes 124 in fluid communication with the second cooling passage 118. During operation, the plurality of forward exhaust holes 124 discharge cooling fluid 140 from the second cooling passage 118 into the hot gas flow path of combustion gases 22 flowing through the turbine section 24 of the gas turbine system 10.

A third cooling passage 126 is provided in the seal portion 66 of the body 60 of the turbine shroud 54. As shown in FIG. 4, the third cooling passage 126 is located adjacent the aft end 106 of the seal portion 66. As with the first and second cooling passages 102, 118, the third cooling passage 126 may also extend within the seal portion 66 between the opposing slash faces 80, 82. The third cooling passage 126 is positioned adjacent to and downstream of the central part 108 of the first cooling passage 102, and is positioned radially inward from the aft part 112 of the first cooling passage 102, adjacent the HGP surface 88 of the seal portion 66.

A rib 128 separates the third cooling passage 126 from the aft part 112 of the first cooling passage 102. The rib 128 may extend within the body 60 of the turbine shroud 54 between the opposing slash faces 80, 82. A plurality of impingement openings 130, formed through the rib 128, fluidly couple the aft part 112 of the first cooling passage 102 and the third cooling passage 126. During operation of the gas turbine system 10 (see, FIG. 1), cooling fluid 140 flowing through the aft part 112 of the first cooling passage 102 passes or flows from the aft part 112 of the first cooling passage 102 through the impingement openings 130 to the third cooling passage 126.

The body 60 of the turbine shroud 54 further includes a plurality of aft exhaust holes 132 in fluid communication with the third cooling passage 126. The plurality of aft exhaust holes 132 are configured to discharge cooling fluid 140 from the third cooling passage 126 into the hot gas flow path of combustion gases 22 flowing through the turbine section 24 of the gas turbine system 10.

During operation of gas turbine system 10, cooling fluid 140 (e.g., compressor discharge air) flows under pressure through the body 60 to cool the turbine shroud 54. More specifically, as the turbine shroud 54 is exposed to the combustion gases 22 flowing through the hot gas flow path of the turbine section 24 during operation of gas turbine system 10, cooling fluid 140 is provided to various cooling features (e.g., plenum 100, cooling passages 102, 118, 126, exhaust channels 124, 132, etc.) within the body 60 to cool the turbine shroud 54. In a non-limiting example, the cooling fluid 140 flows into the plenum 100 in the body 60 of the turbine shroud 54 through the inlet opening(s) 90 formed in first surface 76 of the support portion 62 of the body 60 of the turbine shroud 54. Additionally where the turbine shroud 54 includes metering plate(s) 94 affixed to first surface 76, over and/or at least partially covering the inlet opening(s) 90, the metering plate(s) 90 regulate the amount and pressure of a fixed flow of the cooling fluid 140 flowing through the inlet opening(s) 90 into the plenum(s) 100.

The cooling fluid 140 is configured to flow from the inlet opening(s) 90, through the plenum 100, and radially toward the cooling passages 102, 118, 126 formed within the seal portion 66 of the body 60 of the turbine shroud 54. More specifically, the cooling fluid 140 provided to the plenum 100 flows radially through the plenum 100 toward the rib 114, and subsequently through the impingement openings 116 in the rib 114 to the central part 108 of the first cooling passage 102. From the central part 108 of the first cooling passage 102, the cooling fluid 140 flows axially into the forward part 110 and aft part 112 of the first cooling passage 102.

The portion of the cooling fluid 140 flowing into the forward part 110 of the first cooling passage 102 flows through the impingement openings 122 formed in the rib 120 into the second cooling passage 118. Similarly, the portion of the cooling fluid 140 flowing into the aft part 112 of the first cooling passage 102 flows through the impingement openings 130 formed in the rib 128 into the third cooling passage 126.

From the second cooling passage 118, a portion of the cooling fluid 140 may flow out of the body 60 of the turbine shroud 54 through the exhaust holes 124. Additionally, a portion of the cooling fluid 140 in the third cooling passage 126 may flow out of the body 60 through the exhaust holes 132. The remaining cooling fluid 140 not exhausted via the exhaust holes 124, 132 may be provided to other cooling features in the body 60 of the turbine shroud 54.

A breach may form in the HGP surface 88 of the turbine shroud 54 as a result of oxidation following TBC spallation. The breach may increase in size due to continued oxidation of the HGP surface 88 in the vicinity of the breach, reducing the operational lifetime of the turbine shroud 54.

Figure 6:
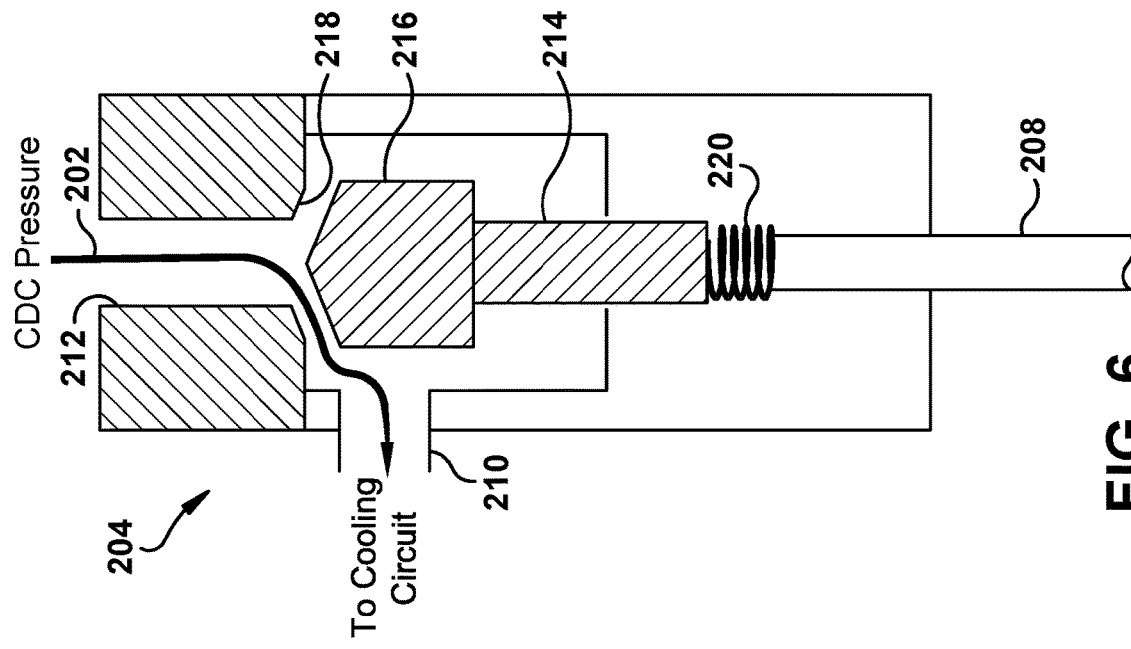
FIG. 6 depicts a pressure-actuated switch in an actuated state according to embodiments.
Figure 5:
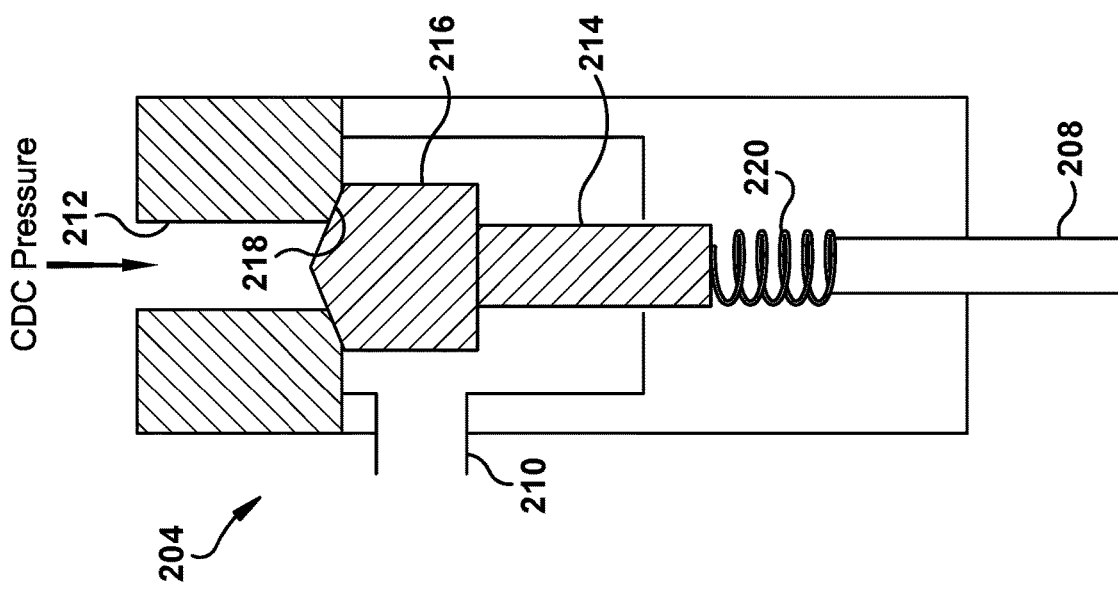
FIG. 5 depicts a pressure-actuated switch in a non-actuated state according to embodiments.
Figure 7:
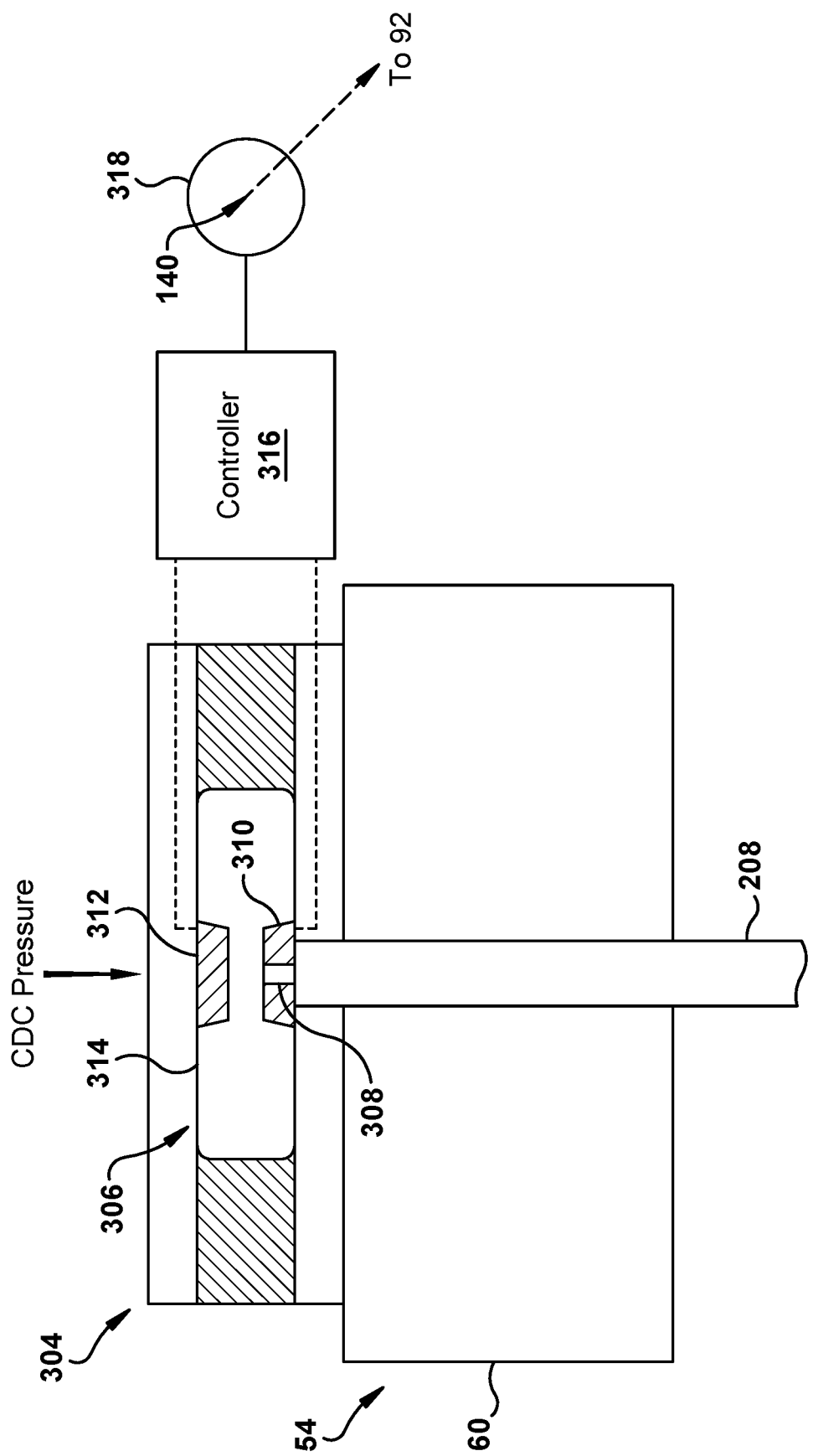
FIG. 7 depicts a pressure-actuated switch in a non-actuated state according to other embodiments.
Figure 8:
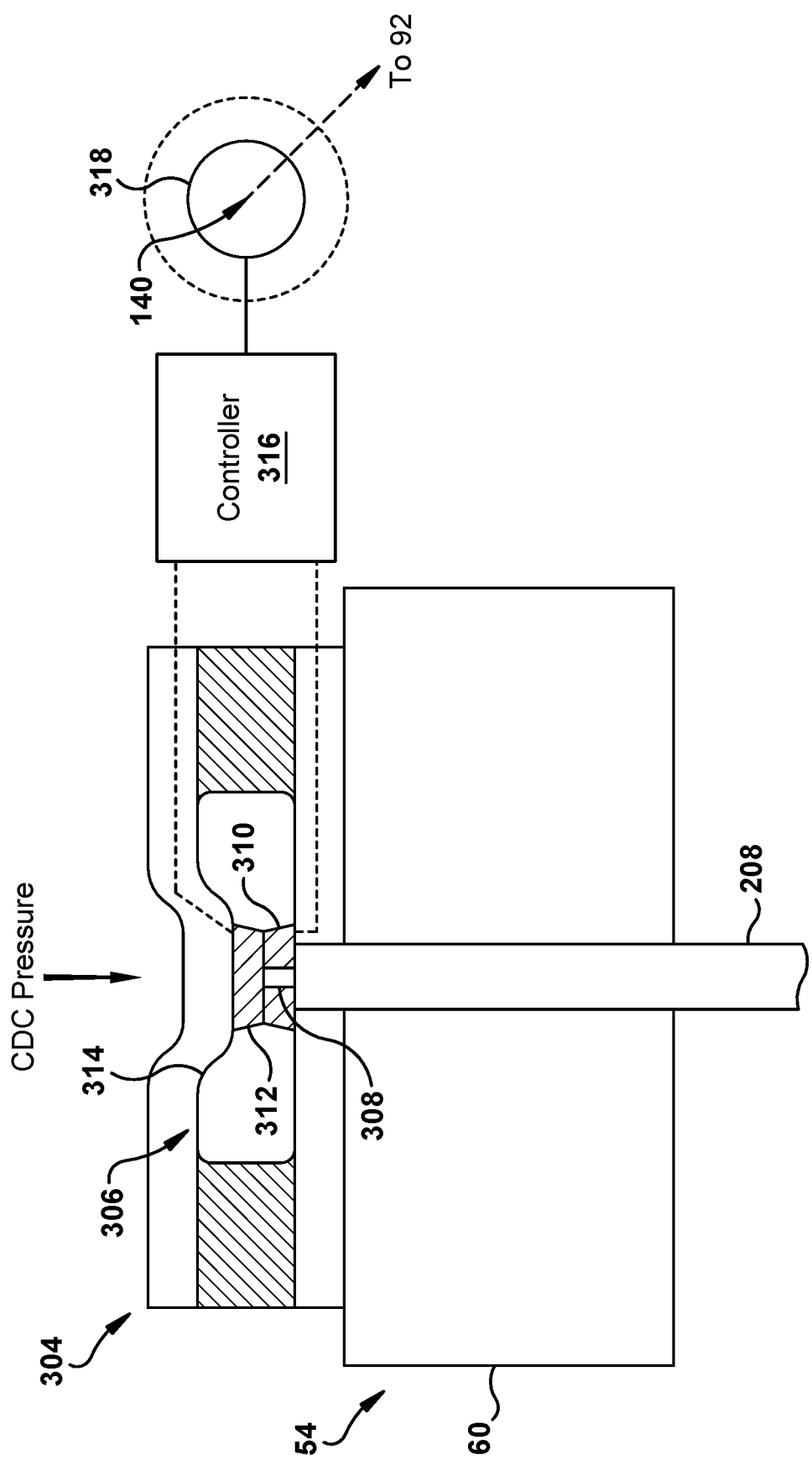
FIG. 8 depicts a pressure-actuated switch in an actuated state according to other embodiments.

According to embodiments, a flow regulating system 200 is provided for delivering a supplemental flow of cooling fluid 202 to the cooling circuit 92 of the turbine shroud 54 in response to the formation of a breach in the HGP surface 88. In particular, in response to the formation of a breach in the HGP surface 88, the flow regulating system 200 is configured to direct the supplemental flow of cooling fluid 202 into the cooling circuit 92 (e.g., into the plenum 100) in the body 60 of the turbine shroud 54. The flow regulating system 200 may be used, for example as depicted in FIGS. 5 and 6, to provide a supplemental flow of cooling fluid 202 to the cooling circuit 92 of a turbine shroud 54 that has its cooling fluid 140 fed directly from the discharge of the compressor section 12 (FIG. 1) of the gas turbine system 10 (e.g., $1^{st}$ stage or above). According to other embodiments, the flow regulating system 200 may be used, for example as depicted in FIGS. 7 and 8, to increase the flow of cooling fluid 140 to the cooling circuit 92 of a turbine shroud 54 that receives its cooling fluid 140 through an extraction port of the compressor section 12 of the gas turbine system 10 (e.g., $2^{nd}$ stage or above). Although described herein in conjunction with a turbine shroud 54, it should be noted that the flow regulating system 200 may be configured for use with other components of a gas turbine system 10 that may be subject to oxidation. For example, the flow regulating system 200 may be configured to provide a supplemental supply of cooling fluid (or an increased flow of cooling fluid) to the cooling system of a component such as a turbine blade, nozzle, and/or the like, in response to the formation of a breach in a HGP surface of the component.

According to various embodiments, the flow regulating system 200 includes a pressure-actuated switch 204 (FIGS. 5 and 6) or 304 (FIGS. 7 and 8) and a pneumatic circuit 206 (FIGS. 3 and 4) including a set of interconnected pneumatic passages 208 entirely embedded within the HGP surface 88. At least one of the pneumatic passages 208 is fluidly coupled to the pressure-actuated switch 204, 304. As shown in FIGS. 3 and 4, the pneumatic passages 208 may be provided in a grid-like pattern within the HGP surface 88. Many other configurations may also be used. For example, the pneumatic passages 208 may be provided in a sinusoidal configuration, a cross-hatched configuration, a spiral configuration, a rectangular grid, etc. In general, the arrangement and spacing of the pneumatic passages 208 within the HGP surface 88 is such that even a relatively small breach in the HGP surface 88 will result in the exposure of one or more of the pneumatic passages 208 in the HGP surface 88. In the absence of a breach, none of the pneumatic passages 208 of the pneumatic circuit 206 are exposed.

During normal operation (e.g., the absence of breach in the HGP surface 88), the pressure within the pneumatic passages 208 of the pneumatic circuit 206 is sufficient to maintain the pressure-actuated switch 204, 304 in a non-actuated state. When a breach forms in the HGP surface 88, resulting in the exposure of one or more of the pneumatic passages 208 of the pneumatic circuit 206 embedded within the HGP surface 88, the pressure within the pneumatic passages 208 of the pneumatic circuit 206 drops, resulting in an actuation of the pressure-actuated switch 204, 304. When actuated, the pressure-actuated switch 204, 304 allows a supplemental supply of cooling fluid 202 (or an increased flow of cooling fluid 140) to flow into the cooling system 92 of the turbine shroud 54. Advantageously, the increased flow of cooling fluid into the cooling system 92 is such that the oxidation of the HGP surface 88 in the vicinity of the breach is impeded or arrested.

A pressure-actuated switch 204 according to embodiments is depicted in FIGS. 5 and 6. The pressure-actuated switch 204 is configured to selectively provide a supplemental supply of cooling fluid 202 to the cooling system 92 of the turbine shroud 54 in response to the formation of a breach in the HGP surface 88. The pressure-actuated switch 204 includes a fluid outlet 210 and a fluid inlet 212 that is fluidly coupled to a pressurized source of cooling fluid. In FIG. 5, for example, the fluid inlet 212 of the pressure-actuated switch 204 is fluidly coupled to a compressor discharge chamber (CDC), which receives a flow of compressed air 16 (FIG. 1) from the compressor portion 12 of the gas turbine system 10.

The pressure-actuated switch 204 further includes a piston 214 and a disc 216 coupled to the piston 214 that is configured to mate with a seat 218. A biasing element 220, such as a spring or the like, biases the disc 216 toward the seat 218. A distal end of the piston 214 is fluidly coupled to the pneumatic circuit 206 via one or more of the pneumatic passages 208.

In the absence of a breach in the HGP surface 88, as shown in FIG. 5, the pressure within the pneumatic passages 208 together with the biasing force applied by the biasing element 220 is greater than the pressure within the compressor discharge chamber. As such, the disc 216 coupled to the piston 214 is forced against the seat 218, closing the pressure-actuated switch 204. This prevents the supplemental supply of cooling fluid 202 from flowing from the compressor discharge chamber into the cooling system 92 of the turbine shroud 54.

The pressure-actuated switch 204 is actuated in response to the formation of a breach (e.g., due to oxidation) in the HGP surface 88 and an exposure of at least a portion of the pneumatic passages 208 of the pneumatic circuit 206 embedded within the HGP surface 88. The exposure causes a loss of pressure within the pneumatic passages 208 of the pneumatic circuit 206. As a result, as shown in FIG. 6, the pressure within the compressor discharge chamber is now greater than the biasing force applied by the biasing element 220, forcing the disc 216 coupled to the piston 214 away from the seat 218 and fluidly coupling the fluid inlet 212 to the fluid outlet 210 of the pressure-actuated switch 204. A supplemental supply of cooling fluid 202 can now flow from the compressor discharge chamber through the pressure-actuated switch 204 into the cooling system 92 of the turbine shroud 54. The increased flow of cooling fluid into the cooling system 92 impedes or arrests the oxidation of the HGP surface 88 in the vicinity of the breach.

A pressure-actuated switch 304 according to other embodiments is depicted in FIGS. 7 and 8. The pressure-actuated switch 304 is configured to selectively trigger an increase in the flow of cooling fluid 140 provided to the cooling system 92 of the turbine shroud 54 in response to the formation of a breach in the HGP surface 88. The pressure-actuated switch 304 may be used, for example, in a turbine shroud 52 that receives its cooling fluid 140 via an extraction port of the compressor section 12 of the gas turbine system 10 (e.g., $2^{nd}$ stage or above).

The pressure-actuated switch 304 may be positioned on the body 60 of the turbine shroud 54. The pressure-actuated switch 304 includes a deformable chamber 306 that is fluidly coupled via a port 308 to one or more of the pneumatic passages 208 of the pneumatic circuit 206. The port 308 passes through a first electrical contact 310 positioned on a first surface of the deformable chamber 306. A second electrical contact 312 is provided on a second, opposing surface 314 of the deformable chamber 306. The first surface 314 of the deformable chamber 306 is exposed to the pressure within the compressor discharge chamber, which receives a flow of compressed air 16 (FIG. 1) from the compressor portion 12 of the gas turbine system 10.

In the absence of a breach in the HGP surface 88, as shown in FIG. 7, the pressure within the pneumatic passages 208 (and within the deformable chamber 306) is higher than the pressure within the compressor discharge chamber. The higher pressure in the deformable chamber 306 causes the deformable chamber 306 to expand, which prevents the second electrical contact 312 from coming into contact with the first electrical contact 310. The pressure-actuated switch 304 is thus in an non-actuated state. The first and second electrical contacts 310, 312 are electrically connected to a controller 316.

The pressure-actuated switch 304 is activated in response to the formation of a breach (e.g., due to oxidation) in the HGP surface 88 and an exposure of at least a portion of the pneumatic passages 208 of the pneumatic circuit 206 embedded within the HGP surface 88. The exposure causes a loss of pressure within the pneumatic passages 208 of the pneumatic circuit 206. As a result, the compressor discharge chamber pressure is now greater than the pressure within the deformable chamber 306. As shown in FIG. 8, this results in the collapse of the deformable chamber 306. As a consequence, the first electrical contact 310 is displaced toward and against the second electrical contact 312, completing an electrical circuit and activating the pressure-actuated switch 304.

In response to the activation of the pressure-actuated switch 304, the controller 316 increases the amount of cooling fluid 140 flowing through the extraction port 318 into the cooling system 92 of the turbine shroud 54. The increased flow of cooling fluid 140 may be provided, for example, by enlarging the size of the opening of the extraction port 318 as shown in phantom in FIG. 8 in response to a signal from the controller 316. The increased flow of cooling fluid 140 into the cooling system 92 impedes or arrests the oxidation of the HGP surface 88 in the vicinity of the breach.

Figure 10:
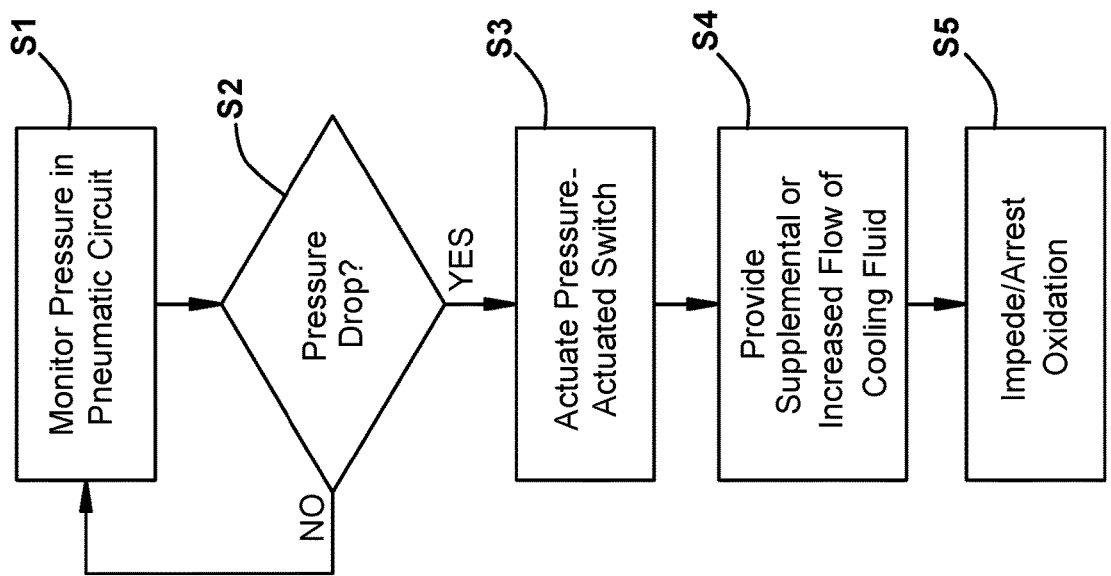
FIG. 10 depicts a flow diagram of a method for impeding and/or arresting oxidation according to embodiments of the disclosure.

A flow diagram of a method for impeding and/or arresting oxidation according to embodiments is depicted in FIG. 10, and is described with reference to FIGS. 3-8. At S1, the pressure within the pneumatic passages 208 of the pneumatic circuit 206 is monitored by a flow monitoring system 200. In response to a drop in pressure in the pneumatic circuit 206 (YES at S2), flow passes to S3. In the absence of a drop in pressure in the pneumatic circuit 206 (NO at S2), flow passes back to S1.

At S3, a pressure-actuated switch 204, 304 is actuated in response to the drop in pressure in the pneumatic circuit 206. At S4, a supplemental flow of cooling fluid 202 or an increased flow of cooling fluid 140 is provided to the cooling system 92 of the turbine shroud 54. At S5, oxidation in the vicinity of the breach in the HGP surface 88 of the turbine shroud 54 is impeded or arrested due to the supplemental flow of cooling fluid 202 or the increased flow of cooling fluid 140.

As detailed above, the body 60 of the turbine shroud 54, and various other components and/or features of the turbine shroud 54, including various components/portions of the flow regulating system 200 disclosed herein, may be formed using any suitable technique, including an additive manufacturing process. The additive manufacturing process may use any suitable material capable of withstanding the operational characteristics (e.g., exposure temperature, exposure pressure, and the like) experienced by the turbine shroud 54 within gas turbine system 10 during operation.

As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM). In the current setting, DMLM or SLM have been found advantageous.

Figure 9:
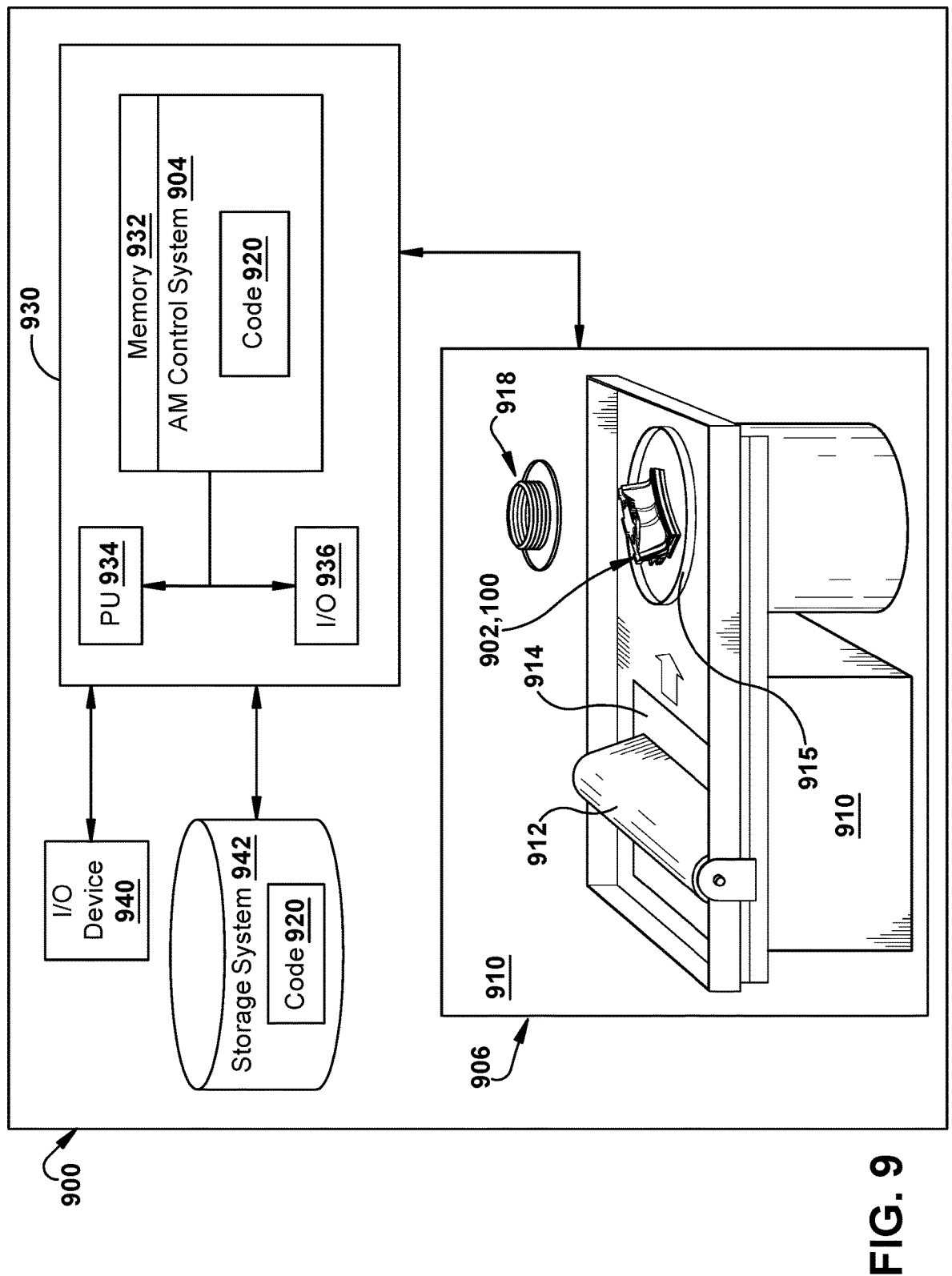
FIG. 9 depicts a block diagram of an additive manufacturing process including a non-transitory computer readable storage medium storing code representative of a turbine shroud according to embodiments of the disclosure.

To illustrate an example of an additive manufacturing process, FIG. 9 shows a schematic/block view of an illustrative computerized additive manufacturing system 900 for generating an object 902. In this example, the system 900 is arranged for DMLM. It is understood that the general teachings of the disclosure are equally applicable to other forms of additive manufacturing. The object 902 is illustrated as a turbine shroud 54 (see, FIGS. 2-8). The AM system 900 generally includes a computerized additive manufacturing (AM) control system 904 and an AM printer 906. The AM system 900, as will be described, executes code 920 that includes a set of computer-executable instructions defining the turbine shroud 54 to physically generate the object 902 using the AM printer 906. Each AM process may use different raw materials in the form of, for example, fine-grain powder, liquid (e.g., polymers), sheet, etc., a stock of which may be held in a chamber 910 of the AM printer 906. In the instant case, the turbine shroud 54 may be made of a metal or metal compound capable of withstanding the environment of a gas turbine system 10 (see, FIG. 1). As illustrated, an applicator 912 may create a thin layer of raw material 914 spread out as the blank canvas on a build plate 915 of AM printer 906 from which each successive slice of the final object will be created. In other cases, the applicator 912 may directly apply or print the next layer onto a previous layer as defined by code 920, e.g., where a metal binder jetting process is used. In the example shown, a laser or electron beam 916 fuses particles for each slice, as defined by code 920, but this may not be necessary where a quick setting liquid plastic/polymer is employed. Various parts of the AM printer 906 may move to accommodate the addition of each new layer, e.g., a build platform 918 may lower and/or chamber 910 and/or applicator 912 may rise after each layer.

The AM control system 904 is shown implemented on a computer 930 as computer program code. To this extent, the computer 930 is shown including a memory 932, a processor 934, an input/output (I/O) interface 936, and a bus 938. Further, the computer 930 is shown in communication with an external I/O device/resource 940 and a storage system 942. In general, the processor 934 executes computer program code, such as the AM control system 904, that is stored in memory 932 and/or storage system 942 under instructions from code 920 representative of turbine shroud 54, described herein. While executing computer program code, the processor 934 can read and/or write data to/from memory 932, storage system 942, I/O device 940, and/or AM printer 906. The bus 938 provides a communication link between each of the components in the computer 930, and the I/O device 940 can comprise any device that enables a user to interact with computer 940 (e.g., keyboard, pointing device, display, etc.). The computer 930 is only representative of various possible combinations of hardware and software. For example, the processor 934 may comprise a single processing unit, or be distributed across one or more processing units in one or more locations, e.g., on a client and server. Similarly, the memory 932 and/or storage system 942 may reside at one or more physical locations. The memory 932 and/or storage system 942 can comprise any combination of various types of non-transitory computer readable storage medium including magnetic media, optical media, random access memory (RAM), read only memory (ROM), etc. The computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of the turbine shroud 54. For example, the code 920 may include a precisely defined 3D model of the turbine shroud 54 and can be generated from any of a large variety of well-known computer aided design (CAD) software systems such as AutoCAD®, TurboCAD®, DesignCAD 3D Max, etc. In this regard, the code 920 can take any now known or later developed file format. For example, the code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. The code 920 may be translated between different formats, converted into a set of data signals and transmitted, received as a set of data signals and converted to code, stored, etc., as necessary. The code 920 may be an input to system 900 and may come from a part designer, an intellectual property (IP) provider, a design company, the operator or owner of system 900, or from other sources. In any event, the AM control system 904 executes the code 920, dividing the turbine shroud 54 into a series of thin slices that it assembles using the AM printer 906 in successive layers of liquid, powder, sheet or other material. In the DMLM example, each layer is melted to the exact geometry defined by the code 920 and fused to the preceding layer. Subsequently, the turbine shroud 54 may be exposed to any variety of finishing processes, e.g., those described herein for re-contouring or other minor machining, sealing, polishing, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A flow regulating system for increasing a flow of cooling fluid supplied to a cooling system of a component of a gas turbine system, comprising:
   a pneumatic circuit embedded within a section of the component, the pneumatic circuit including a set of interconnected pneumatic passages; and
   a pressure-actuated switch fluidly coupled to the pneumatic circuit, wherein the pressure-actuated switch is activated in response to a formation of a breach in the section of the component and an exposure of at least one of the pneumatic passages of the pneumatic circuit embedded in the section of the component;
   wherein activation of the pressure-actuated switch increases the flow of cooling fluid supplied to the cooling system of the component.

2. The flow regulating system according to claim 1, wherein the pressure-actuated switch is actuated in response to a reduction in pressure in the pneumatic circuit due to the exposure of at least one of the pneumatic passages of the pneumatic circuit embedded in the section of the component.

3. The flow regulating system according to claim 2, wherein the pressure-actuated switch includes a fluid inlet fluidly coupled to a pressurized source of cooling fluid and a fluid outlet fluidly coupled to the cooling system of the component.

4. The flow regulating system according to claim 3, wherein the pressurized source of cooling fluid comprises a compressor discharge chamber of a compressor component of the gas turbine system.

5. The flow regulating system according to claim 4, wherein a pressure in the compressor discharge chamber actuates the pressure-actuated switch in response to the reduction in pressure in the pneumatic circuit.

6. The flow regulating system according to claim 2, wherein the pressure-actuated switch includes:
   a compressible chamber exposed to a pressure within a compressor discharge chamber of a compressor component of the gas turbine system;
   a first electrical contact on a first side of the compressible chamber; and
   a second electrical contact on a second, opposing side of the compressible chamber.

7. The flow regulating system according to claim 6, further including a port extending through the first electrical contact, the port fluidly coupling an interior of the compressible chamber to the pneumatic circuit embedded within the section of the component.

8. The flow regulating system according to claim 7, wherein the pressure within the compressor discharge chamber of the compressor component displaces the second electrical contact toward and into contact with the first electrical contact in response to the reduction in pressure in the pneumatic circuit.

9. The flow regulating system according to claim 8, further including a controller for increasing a flow of cooling fluid through an extraction port of the compressor section of the gas turbine system and into the cooling system of the component in response to the second electrical contact contacting the first electrical contact.

10. The flow regulating system according to claim 1, wherein the cooling system of the component receives a flow of cooling fluid, and wherein the activation of the pressure-actuated switch causes a separate, supplemental flow of cooling fluid to enter the cooling system of the component.

11. The flow regulating system according to claim 1, wherein the component of the gas turbine system includes a turbine shroud.

12. The flow regulating system according to claim 1, wherein the increase in the flow of cooling fluid supplied to the cooling system of the component impedes or arrests oxidation in a vicinity of the breach in the component.

13. A system, comprising:
   a turbine shroud;
   a cooling system for cooling the turbine shroud; and
   a flow regulating system for increasing a flow of cooling fluid supplied to the cooling system of the turbine shroud, the flow regulating system including:
      a pneumatic circuit embedded within a section of the turbine shroud, the pneumatic circuit including a set of interconnected pneumatic passages; and
      a pressure-actuated switch fluidly coupled to the pneumatic circuit, wherein the pressure-actuated switch is activated in response to a formation of a breach in the section of the turbine shroud and an exposure of at least one of the pneumatic passages of the pneumatic circuit embedded in the section of the turbine shroud, the exposure causing a reduction in pressure in the pneumatic circuit;
      wherein activation of the pressure-actuated switch increases the flow of cooling fluid supplied to the cooling system of the turbine shroud.

14. The system according to claim 13, wherein the pressure-actuated switch includes a fluid inlet fluidly coupled to a pressurized source of cooling fluid and a fluid outlet fluidly coupled to the cooling system of the turbine shroud, the pressurized source of cooling fluid comprising a compressor discharge chamber of a compressor component of a gas turbine system.

15. The system according to claim 14, wherein the activation of the pressure-actuated switch causes a separate, supplemental flow of cooling fluid to enter the cooling system of the component from the compressor discharge chamber, the supplemental flow of cooling fluid increasing a total flow of cooling fluid into the cooling system.

16. The system according to claim 14, wherein the pressure-actuated switch includes:
   a compressible chamber exposed to a pressure within the compressor discharge chamber of the compressor component of the gas turbine system;
   a first electrical contact on a first side of the compressible chamber;
   a second electrical contact on a second, opposing side of the compressible chamber; and
   a port extending through the first electrical contact, the port fluidly coupling an interior of the compressible chamber to the pneumatic circuit embedded within the section of the turbine shroud.

17. The system according to claim 16, wherein the pressure within the compressor discharge chamber of the compressor component displaces the second electrical contact toward and into contact with the first electrical contact in response to the reduction in pressure in the pneumatic circuit, and wherein the system further includes a controller for increasing the flow of cooling fluid into the cooling system of the component in response to the second electrical contact contacting the first electrical contact.

\* \* \* \* \*